United States Patent
Keane

(10) Patent No.: US 6,691,792 B2
(45) Date of Patent: Feb. 17, 2004

(54) EDGER ATTACHMENT APPARATUS FOR A STRING TRIMMER DEVICE

(76) Inventor: Stephen Timothy Keane, 36 Castlewood Park, Ennis, Co Clare (IE)

( * ) Notice: Subject to any disclaimer, the term of this patent is extended or adjusted under 35 U.S.C. 154(b) by 0 days.

(21) Appl. No.: 10/147,582

(22) Filed: May 17, 2002

(65) Prior Publication Data

US 2003/0047329 A1 Mar. 13, 2003

(51) Int. Cl.⁷ .............................................. A01D 34/00
(52) U.S. Cl. ........................... 172/14; 172/17; 56/13.7; 30/DIG. 5; 30/287
(58) Field of Search ............................... 172/13, 14, 15, 172/17, 19, 41, 42; 56/255, 256, 16.9, 12.7, 17.5, 13.7; 30/296.1, 303, DIG. 5, 276, 286, 287

(56) References Cited

U.S. PATENT DOCUMENTS

| | | | | |
|---|---|---|---|---|
| 3,679,003 A | * | 7/1972 | Wadsworth | 172/15 |
| 4,224,784 A | * | 9/1980 | Hansen et al. | 56/16.9 |
| 4,242,855 A | * | 1/1981 | Beaver, Jr. | 56/13.7 |
| 4,364,435 A | * | 12/1982 | Tuggle et al. | 172/15 |
| 4,442,659 A | * | 4/1984 | Enbusk | 56/12.7 |
| 4,505,040 A | * | 3/1985 | Everts | 30/296.1 |
| 4,733,471 A | * | 3/1988 | Rahe | 30/276 |
| 4,756,148 A | * | 7/1988 | Gander et al. | 56/17.2 |
| 4,936,886 A | * | 6/1990 | Quillen | 56/16.7 |
| 5,029,435 A | * | 7/1991 | Buchanan | 56/12.1 |
| 5,107,665 A | * | 4/1992 | Wright | 56/12.7 |
| 5,228,276 A | * | 7/1993 | Miller | 56/12.1 |
| 5,263,303 A | * | 11/1993 | Stroud | 56/12.7 |
| 5,408,816 A | * | 4/1995 | Cartier | 56/17.5 |
| 5,467,584 A | * | 11/1995 | Boyles | 56/12.7 |
| 5,603,205 A | * | 2/1997 | Foster | 56/16.7 |
| 5,613,354 A | * | 3/1997 | Foster | 56/16.7 |
| 5,649,413 A | * | 7/1997 | Oostendorp | 56/12.7 |
| 5,661,960 A | * | 9/1997 | Smith et al. | 56/12.7 |
| 5,802,724 A | * | 9/1998 | Rickard et al. | 30/296.1 |
| 5,826,667 A | * | 10/1998 | Notaras et al. | 172/15 |
| 5,918,683 A | * | 7/1999 | Abelsson et al. | 172/15 |
| 6,006,434 A | * | 12/1999 | Templeton et al. | 30/296.1 |
| 6,357,215 B1 | * | 3/2002 | Thorne | 56/295 |
| 6,427,341 B1 | * | 8/2002 | Lee | 30/347 |
| 6,460,253 B1 | * | 10/2002 | Wheeler et al. | 30/276 |
| 6,474,747 B2 | * | 11/2002 | Beaulieu et al. | 30/296.1 |
| 6,516,598 B1 | * | 2/2003 | Notaras et al. | 56/16.7 |

\* cited by examiner

*Primary Examiner*—Victor Batson

(57) ABSTRACT

An edger attachment apparatus is provided for attaching to a drive-shaft-to-attachment coupling of a string trimmer device after the string trimmer head has been detached from the drive-shaft-to-attachment coupling. A relatively small diameter, power transmission driving gear is driven by an edger driven shaft. A relatively large diameter, power receiver gear is driven by the relatively small diameter, power transmission driving gear. A blade assembly drive shaft is connected to the relatively large diameter, power receiver gear. An edger blade assembly is driven by the blade assembly drive shaft. A wheel assembly support is attached to the gear housing, and a wheel assembly is connected to the wheel assembly support. In one embodiment, a height adjustment assembly is provided. In another embodiment, a tilt adjustment assembly is provided. In another embodiment, both a height adjustment assembly and a tilt adjustment assembly are provided.

21 Claims, 7 Drawing Sheets

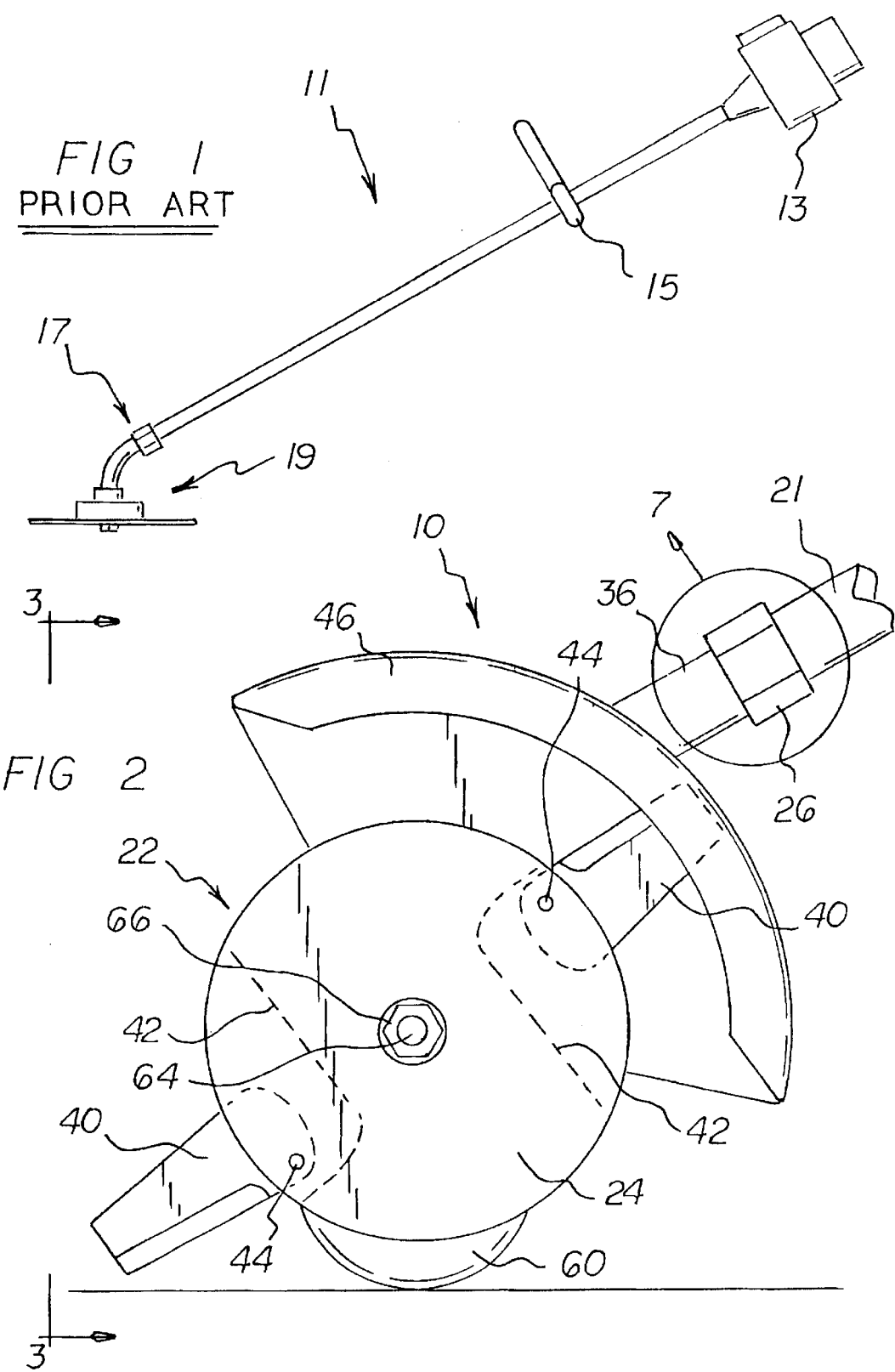

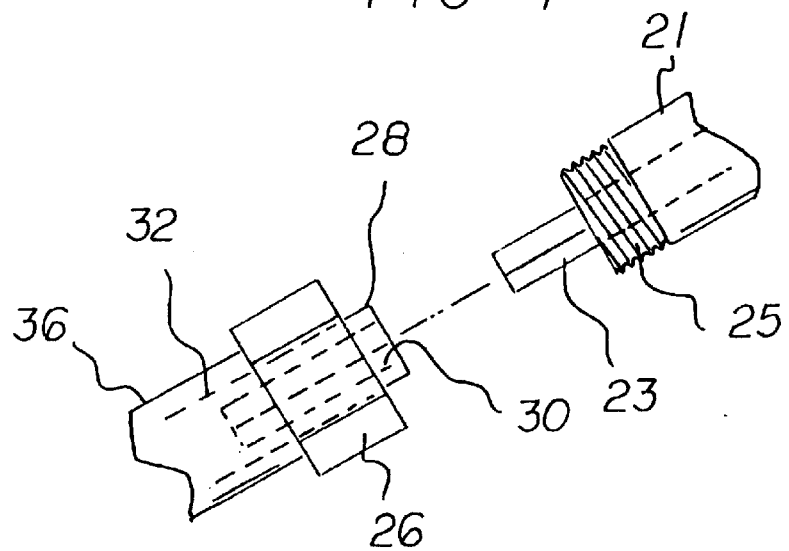
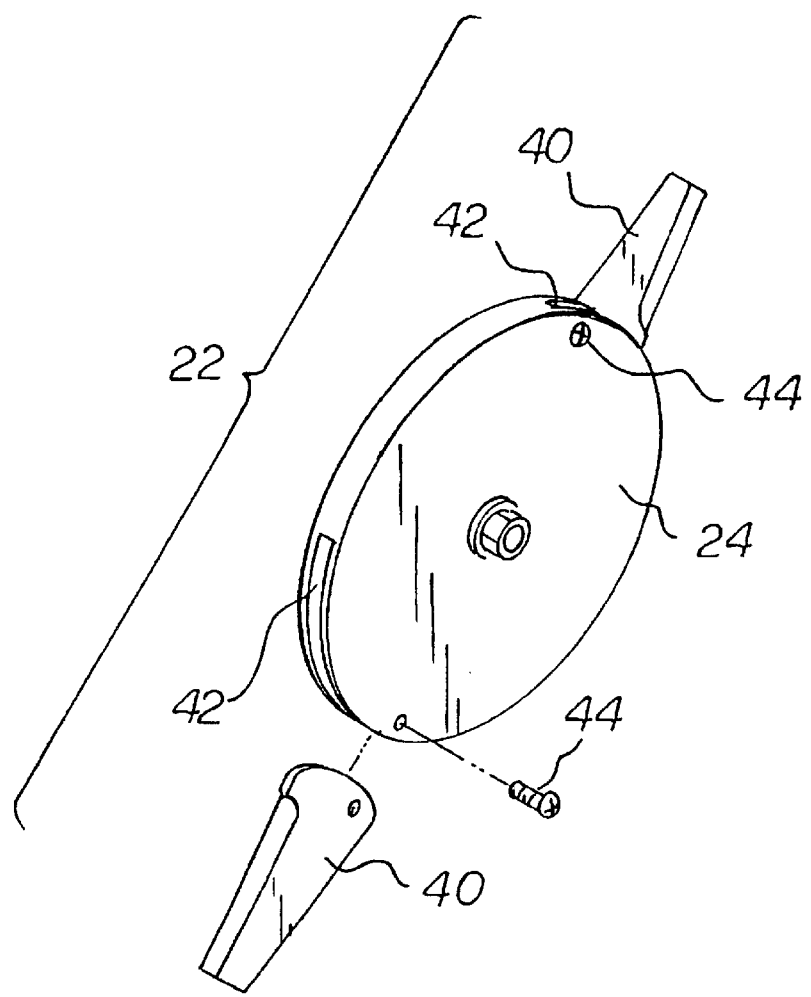

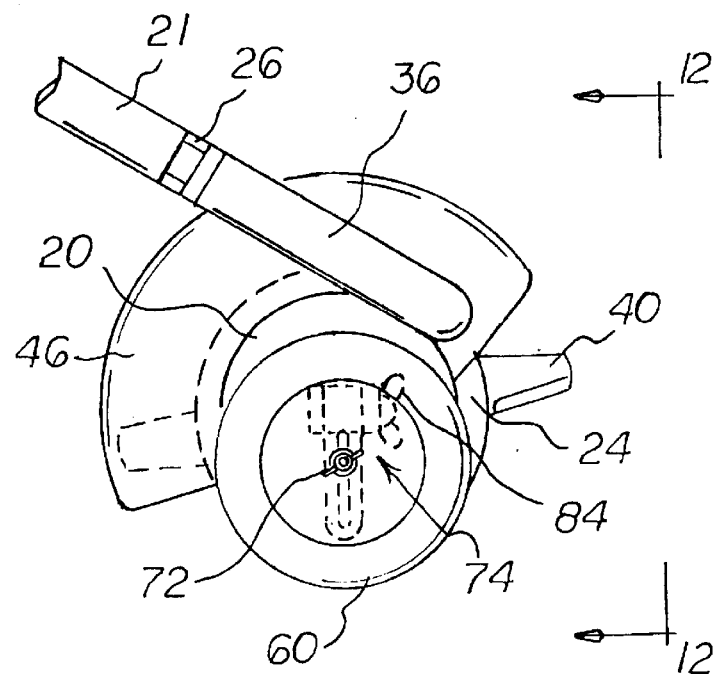
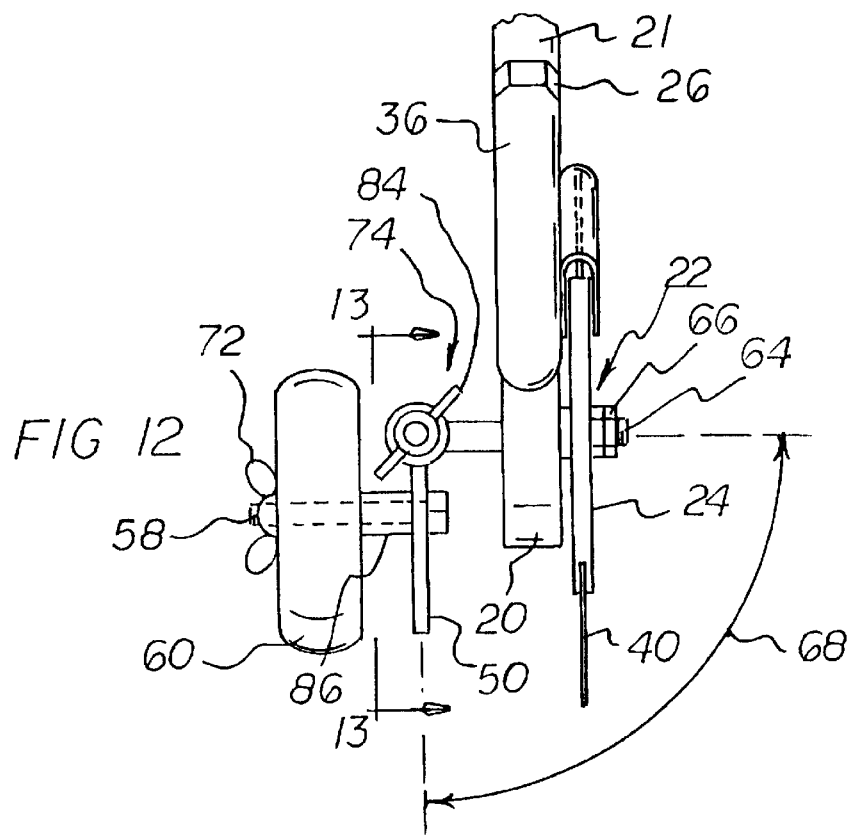

EDGER ATTACHMENT APPARATUS FOR A STRING TRIMMER DEVICE

BACKGROUND OF THE INVENTION

RELATED APPLICATION

This application claims priority based upon my prior United Kingdom patent application, Serial No. GB 0112409.8, filed May 22, 2001.

1. Field of the Invention

The present invention relates generally to lawn care equipment and, more particularly, to lawn care equipment especially adapted for providing a clean cut lawn edge along hard surface.

2. Description of the Prior Art

String trimmer devices are well known in the art. Generally, a string trimmer device includes a motor, a handle, a drive shaft driven by the motor, a drive-shaft-to-attachment coupling, and a string trimmer head connected to the drive-shaft-to-attachment coupling. A conventional string trimmer device is designed usually to make a generally horizontal cut on grass and other lawn plants.

A lawn care chore, which is often desirable, is to provide a clean cut lawn edge along a hard surface, such as a sidewalk or driveway. To accomplish a clean cut lawn edge, it is necessary to provide a cutting blade that is oriented substantially vertically. There are devices, known as lawn edgers, which are specially designed to provide a clean cut lawn edge, and such lawn edgers include blades that are oriented substantially vertically.

Therefore, with prior art devices, a string trimmer device can be used to carry out a horizontal cutting function, and a lawn edger device can be used to carry out a vertical cutting function. If both the string trimmer device and the lawn edger are motorized, there are two motors, two handles, two drive shaft housings, two drive shafts, etc.

For purposes of economy and efficiency, it would be desirable if an apparatus could be provided that can carry out both a horizontal cutting function and a vertical cutting function. More specifically, it would be desirable if an apparatus could be provided that can carry out both a horizontal cutting function and a vertical cutting function without using two motors, two handles, two drive shaft housings, and two drive shafts.

As mentioned above, a string trimmer device includes a motor, a handle, a drive shaft driven by the motor, a drive-shaft-to-attachment coupling, and a string trimmer head connected to the drive-shaft-to-attachment coupling. To perform a desired edge trimmer function, it would be desirable if the string trimmer head could be removed from the drive-shaft-to-attachment coupling and replaced with an edger attachment apparatus. In this way, the motor, handle, drive shaft driven by the motor, and drive-shaft-to-attachment coupling of the string trimmer device could be employed along with the edger attachment apparatus to carry out the edge trimmer function.

Still other features would be desirable in an edger attachment apparatus for a string trimmer device. For example, it would be desirable for the edger attachment apparatus to have a height adjustment feature. It would also be desirable for the edger attachment apparatus to have a tilt adjustment feature. Further with respect to the tilt adjustment feature, it would be desirable if the edger attachment apparatus could be locked into a desired tilt adjustment angle.

Thus, while the foregoing body of prior art indicates it to be well known to use a separate string trimmer device and a separate edger device, the current state of the art discussed above does not teach or suggest an edger attachment apparatus for a string trimmer device which has the following combination of desirable features: (1) can carry out both a horizontal cutting function and a vertical cutting function; (2) does not use two motors, two handles, two drive shaft housings, and two drive shafts; (3) permits removal of a string trimmer head from the drive-shaft-to-attachment coupling of a string trimmer device and replacement thereof with an edger attachment apparatus; (4) provides an edger attachment apparatus which has a height adjustment feature; (5) provides an edger attachment apparatus which has a tilt adjustment feature; and (6) provides an edger attachment apparatus which has a tilt adjustment feature which can be locked into a desired tilt adjustment angle. The foregoing desired characteristics are provided by the unique edger attachment apparatus for a string trimmer device of the present invention as will be made apparent from the following description thereof. Other advantages of the present invention over the prior art also will be rendered evident.

SUMMARY OF THE INVENTION

To achieve the foregoing and other advantages, the present invention, briefly described, provides an edger attachment apparatus for attaching to a drive-shaft-to-attachment coupling of a string trimmer device after the string trimmer head has been detached from the driveshaft-to-attachment coupling. The edger attachment apparatus includes an edger driven-shaft housing attachable to the drive-shaft-to-attachment coupling. An edger driven shaft is housed in the edger driven-shaft housing. A relatively small diameter, power transmission driving gear is driven by the edger driven shaft. A relatively large diameter, power receiver gear is driven by the relatively small diameter, power transmission driving gear. A blade assembly drive shaft is connected to the relatively large diameter, power receiver gear. A gear housing is provided for housing the relatively large diameter, power receiver gear. The gear housing is connected to the edger driven-shaft housing. An edger blade assembly is driven by the blade assembly drive shaft. A wheel assembly support is attached to the gear housing, and a wheel assembly is connected to the wheel assembly support.

An edger driven shaft top bearing and an edger driven shaft bottom bearing are located between ends of the relatively small diameter, power transmission driving gear and the edger driven-shaft housing.

A coupling end reception sleeve is connected to an end of the edger driven shaft. The coupling end reception sleeve includes a coupling end reception well.

The relatively small diameter, power transmission driving gear is housed in the edger driven-shaft housing. The edger blade assembly includes a blade support supported by the blade assembly drive shaft, and blades attached to the blade support.

The blade support includes blade reception slots, and the blades are connected to the blade support with blade pivots. A blade assembly shroud is attached to the gear housing for covering the edger blade assembly.

The relatively small diameter, power transmission driving gear is a worm gear, and the relatively large diameter, power receiver gear is a worm-driven gear. The wheel assembly support includes a wheel assembly attachment plate attached to the gear housing.

In accordance with one embodiment of the invention, a tilt adjustment assembly is embodied in the wheel assembly. The wheel assembly includes a wheel tilt plate. A wheel assembly hinge is connected between the wheel tilt plate and the wheel assembly attachment plate. A wheel axle is connected to the wheel tilt plate. A wheel is supported by the wheel axle, and a wheel axle nut is provided for securing the wheel to the wheel axle.

A blade assembly shroud is attached to the gear housing, and the wheel assembly support includes a wheel assembly attachment plate which is attached to the blade assembly shroud.

In accordance with another embodiment of the invention, a height adjustment assembly includes a wheel assembly attachment plate which includes a height adjustment slot and a height adjustment lock bolt received in the height adjustment slot. The wheel assembly includes a wheel axle attached to the wheel assembly attachment plate. A wheel is received on the wheel axle, and a wheel axle nut is provided for retaining the wheel on the wheel axle.

In accordance with another embodiment of the invention, the relatively small diameter, power transmission driving gear is a first bevel gear, the relatively large diameter, power receiver gear is a second bevel gear.

In accordance with another embodiment of the invention, both a height adjustment assembly and a tilt adjustment assembly are provided.

The height adjustment assembly includes a wheel assembly attachment plate which includes a height adjustment slot. A wheel axle extends through the height adjustment slot in the wheel assembly attachment plate. A wheel axle housing jackets a portion of the wheel axle between a wheel and the wheel assembly attachment plate. A wheel axle nut is in a form of a wing nut for tightening the wheel axle housing against the wheel assembly attachment plate, such that the wheel axle and the wheel are locked in a selected position in the height adjustment slot.

The tilt adjustment assembly includes a tilt angle lock assembly. The tilt angle lock assembly includes a first tilt angle lock member connected to the gear housing. The first tilt angle lock member includes a pair of separated fork portions. A wheel-assembly-attachment-plate support member is received between the separated fork portions. The wheel-assembly-attachment-plate support member is connected to the wheel assembly attachment plate. A tilt angle, wing-headed, locking bolt is threaded through the fork portions and the wheel-assembly-attachment-plate support member.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least three preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved edger attachment apparatus for a string trimmer device which has all of the advantages of the prior art and none of the disadvantages.

It is another object of the present invention to provide a new and improved edger attachment apparatus for a string trimmer device which may be easily and efficiently manufactured and marketed.

It is a further object of the present invention to provide a new and improved edger attachment apparatus for a string trimmer device which is of durable and reliable construction.

An even further object of the present invention is to provide a new and improved edger attachment apparatus for a string trimmer device which is susceptible of a low cost of manufacture with regard to both materials and labor, and which accordingly is then susceptible of low prices of sale to the consuming public, thereby making such edger attachment apparatus for a string trimmer device available to the buying public.

Still yet a further object of the present invention is to provide a new and improved edger attachment apparatus for a string trimmer device which can carry out both a horizontal cutting function, when a string trimmer head is employed, and a vertical cutting function, when the edger attachment apparatus is employed.

Still another object of the present invention is to provide a new and improved edger attachment apparatus for a string trimmer device that does not use two motors, two handles, two drive shaft housings, and two drive shafts.

Yet another object of the present invention is to provide a new and improved edger attachment apparatus for a string trimmer device which permits removal of a string trimmer head from the drive-shaft-to-attachment coupling of a string trimmer device and replacement thereof with an edger attachment apparatus.

Even another object of the present invention is to provide a new and improved edger attachment apparatus for a string trimmer device that provides an edger attachment apparatus which has a height adjustment feature.

Still a further object of the present invention is to provide a new and improved edger attachment apparatus for a string trimmer device which provides an edger attachment apparatus which has a tilt adjustment feature.

Yet another object of the present invention is to provide a new and improved edger attachment apparatus for a string trimmer device that provides an edger attachment apparatus which has a tilt adjustment feature which can be locked into a desired tilt adjustment angle.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a side view showing a PRIOR ART prior art string trimmer device.

FIG. 2 is a side view of a first embodiment of the edger attachment apparatus for a string trimmer device, wherein the first embodiment has a tilt feature.

FIG. 7 is partially exploded view of a portion of the embodiment of the invention shown in FIG. 2, contained in circled region 7 thereof. It is noted that the elements in FIGS. 7 and 8 apply to all embodiments of the invention.

FIG. 8 is a partially exploded perspective view of the edger blade assembly of the invention.

FIG. 11 is a side view of a third embodiment of the edger attachment apparatus of the invention, wherein the third embodiment has both a tilt feature and a height adjustment feature.

FIG. 12 is a front view of the embodiment of the invention shown in FIG. 11, taken along line 12—12 thereof.

DESCRIPTION OF THE PREFERRED EMBODIMENT

Figure 3:
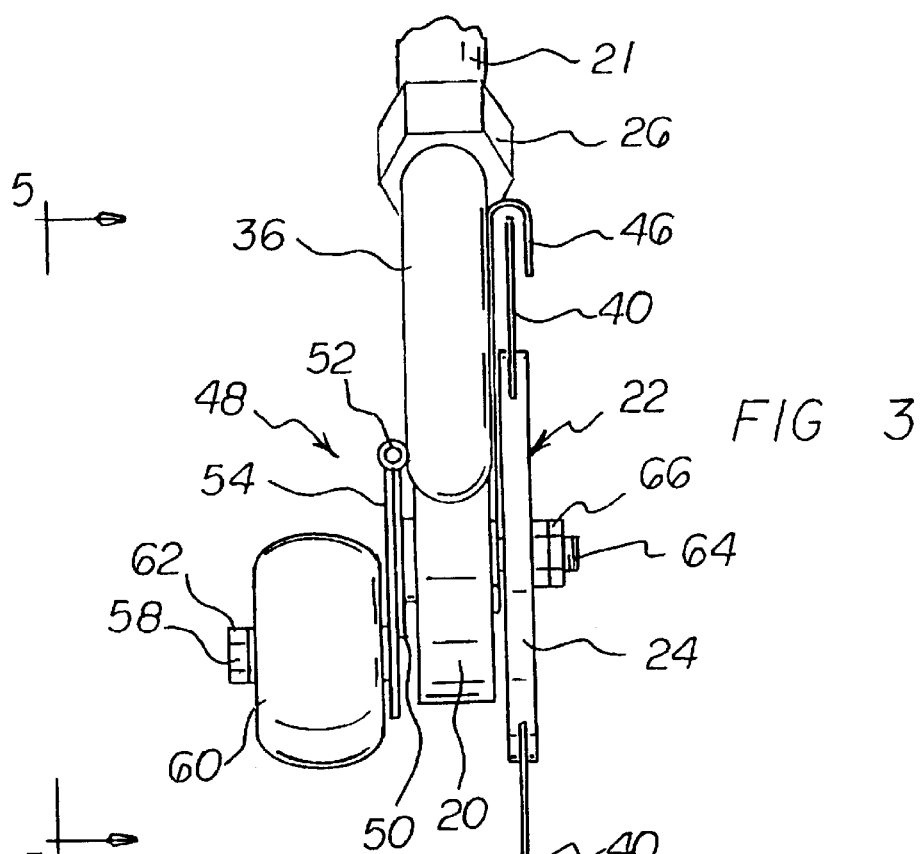
FIG. 3 is a front view of the embodiment of the invention of FIG. 2 taken along line 3—3 thereof, wherein the apparatus is not tilted.

With reference to the drawings, a new and improved edger attachment apparatus for a string trimmer device embodying the principles and concepts of the present invention will be described.

As shown in PRIOR ART FIG. 1, a string trimmer device 11 has a motor 13, a handle 15, a drive shaft housing, a drive-shaft-to-attachment coupling 17, and a string trimmer head 19 attached to the drive-shaft-to-attachment coupling 17.

In accordance with the invention, in general, as shown with all embodiments, an edger attachment apparatus 10 is provided for attaching to a drive-shaft-to-attachment coupling of a string trimmer device after the string trimmer head 19 has been detached from the drive-shaft-to-attachment coupling. The edger attachment apparatus 10 includes an edger driven-shaft housing 36 attachable to the drive-shaft-to-attachment coupling. An edger driven shaft 32 is housed in the edger driven-shaft housing 36. A relatively small diameter, power transmission driving gear is driven by the edger driven shaft 32. A relatively large diameter, power receiver gear is driven by the relatively small diameter, power transmission driving gear. A blade assembly drive shaft 64 is connected to the relatively large diameter, power receiver gear. A gear housing 20 is provided for housing the relatively large diameter, power receiver gear. The gear housing 20 is connected to the edger driven-shaft housing 36. An edger blade assembly 22 is driven by the blade assembly drive shaft 64. A wheel assembly support is attached to the gear housing 20, and a wheel assembly 48 is connected to the wheel assembly support. An edger driven shaft top bearing 38 and an edger driven shaft bottom bearing 34 are located between ends of the relatively small diameter, power transmission driving gear and the edger driven-shaft housing 36.

In general, the relatively small diameter, power transmission driving gear rotates at high speed with relatively power, and the relatively large diameter, power receiver gear rotates at a considerably slower speed with considerably more power. In this respect, the edger blade assembly 22 rotates at a relatively slower speed and with relatively more power than the string trimmer head 19.

As shown in FIG. 7, coupling end reception sleeve 28 is connected to an end of the edger driven shaft 32. The coupling end reception sleeve 28 includes a coupling end reception well 30. The coupling end reception well 30 is used to receive the drive shaft coupling end 23 of the string trimmer device.

Also, with respect to embodiments of the invention in general, the relatively small diameter, power transmission driving gear is housed in the edger driven-shaft housing 36. The edger blade assembly 22 includes a blade support 24 supported by the blade assembly drive shaft 64, and blades 40 attached to the blade support 24. The blade support 24 is fixed onto the blade assembly drive shaft 64 using blade assembly drive shaft nut 66.

The blade support 24 includes blade reception slots 42, and the blades 40 are connected to the blade support 24 with blade pivots 44. When the blade support 24 is spinning, the blades 40 pivot around the blade pivots 44 so that the blades 40 extend radially away from the blade assembly axle 64. In this orientation, the cutting edges of the blades 40 are capable of carrying out the vertical cutting function. However, if an obstruction that cannot be cut, such as a rock or sidewalk, is met by a spinning blade 40, the blade 40 that hits the obstruction will rotate around its respective blade pivot 44, and that blade will enter its respective blade reception slot 42. In this way, the blade 40 that hits the obstruction will not be damaged, and the spinning of the blade support 24 will not be stopped by the obstruction. When the obstruction is passed, the centrifugal force on the blade 40 by the spinning blade support 24 will cause the blade 40 to once again rotate around its respective blade pivot 44 and return to its cutting position where it is oriented radially with respect to the blade assembly axle 64. blade assembly shroud 46 is attached to the gear housing 20 for covering the edger blade assembly 22. The blade assembly shroud 46 is attached to the side wall of the gear housing 20 using machine screws or other fasteners (not shown).

With all embodiments of the invention disclosed herein, the edger driven-shaft housing 36 is connected to the drive shaft housing 21 using lock nut 26. In this respect, the drive shaft housing 21 has drive shaft housing, lock nut engagement threads 25, and the lock nut 26 engages the drive shaft housing, lock nut engagement threads 25.

As shown in FIGS. 2–6, with the first embodiment of the invention, which has a tilt adjustment assembly, the relatively small diameter, power transmission driving gear is a worm gear 12, and the relatively large diameter, power receiver gear is a worm-driven gear 14. The wheel assembly support includes a wheel assembly attachment plate 50 attached to the gear housing 20. The tilt adjustment assembly is embodied in the wheel assembly 48.

The wheel assembly 48 includes a wheel tilt plate 54. A wheel assembly hinge 52 is connected between the wheel tilt plate 54 and the wheel assembly attachment plate 50. A wheel axle 58 is connected to the wheel tilt plate 54. A wheel 60 is supported by the wheel axle 58, and a wheel axle nut 62 is provided for securing the wheel 60 to the wheel axle 58.

As shown in FIG. 3, the drive shaft housing, the blade support 24 and the wheel tilt plate 54 are in substantially parallel planes. In this respect, the edger blade assembly 22 is not tilted with respect to the wheel 60.

Figure 4:
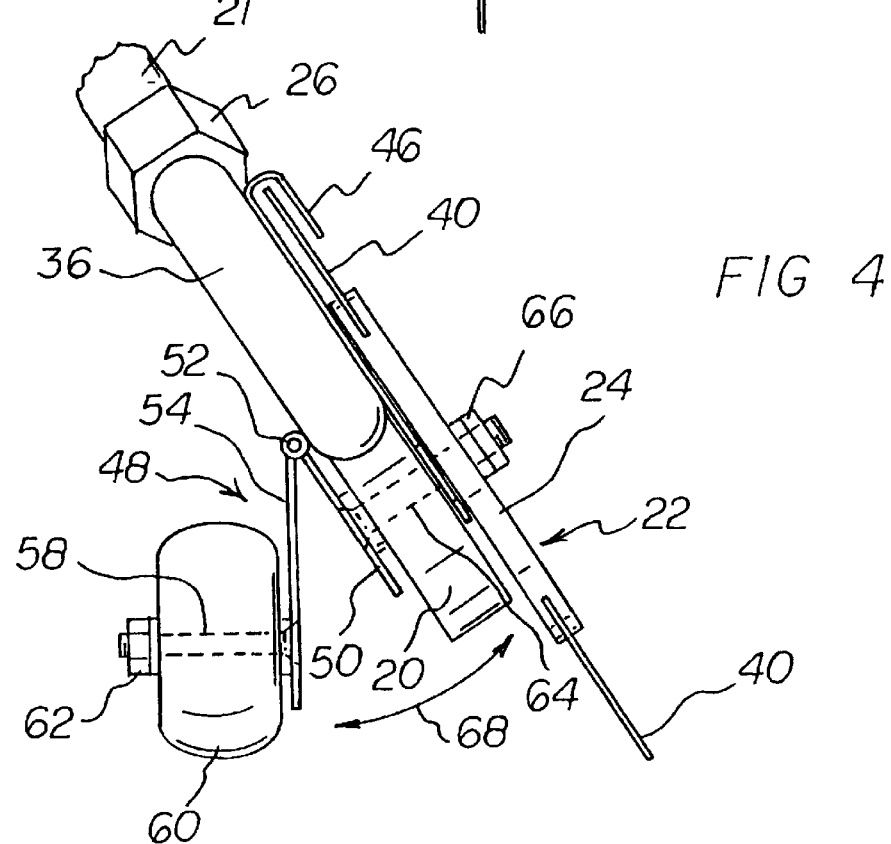
FIG. 4 is a front view of the embodiment of the invention of FIG. 3, wherein the apparatus is tilted.
Figure 5:
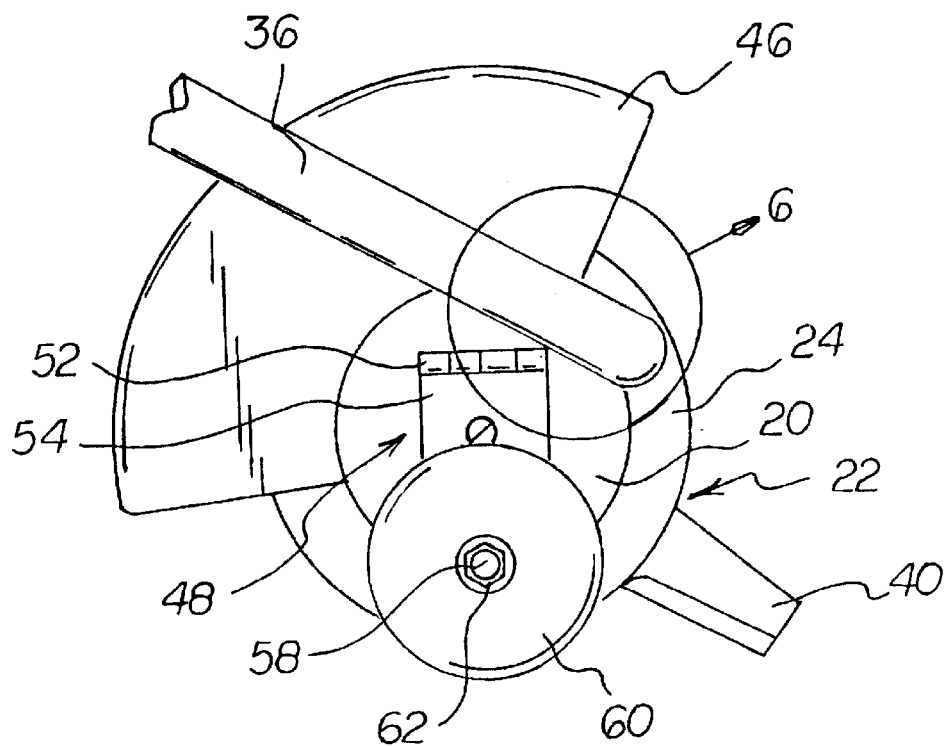
FIG. 5 is a rear view of the embodiment of the invention shown in FIG. 3, taken along line 5—5 thereof.
Figure 6:
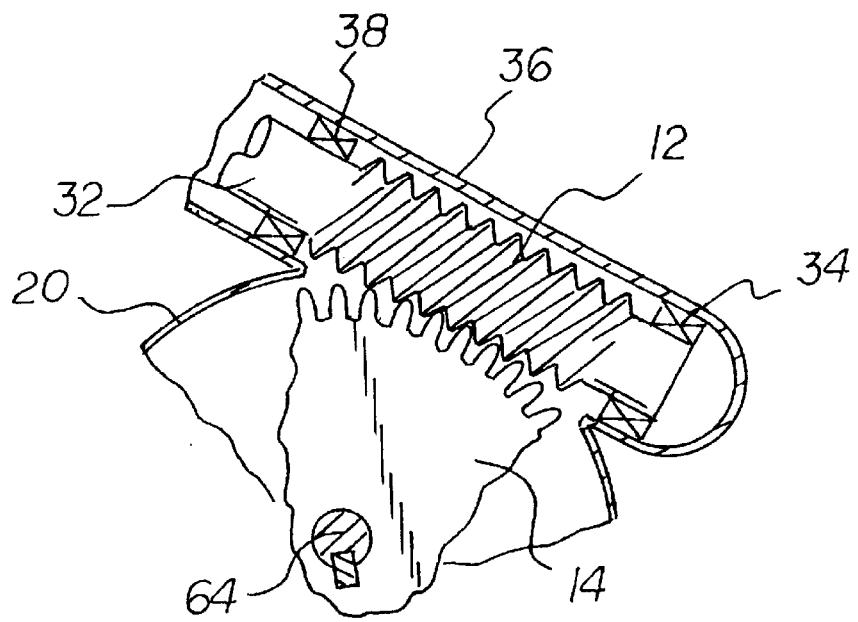
FIG. 6 is an enlarged, partially broken away view of a portion of the embodiment shown in FIG. 5, contained in circled region 6 thereof.

As shown in FIG. 4, the edger blade assembly 22 is tilted with respect to the wheel 60. More specifically, all portions of the apparatus to the right of the wheel assembly hinge 52 are tilted with respect to all portions of the wheel assembly 48 to the left of the wheel assembly hinge 52. In tilting the apparatus, the tilting portions of the apparatus rotate around the wheel assembly hinge 52 as shown by tilt rotation arrow 68.

Figure 9:
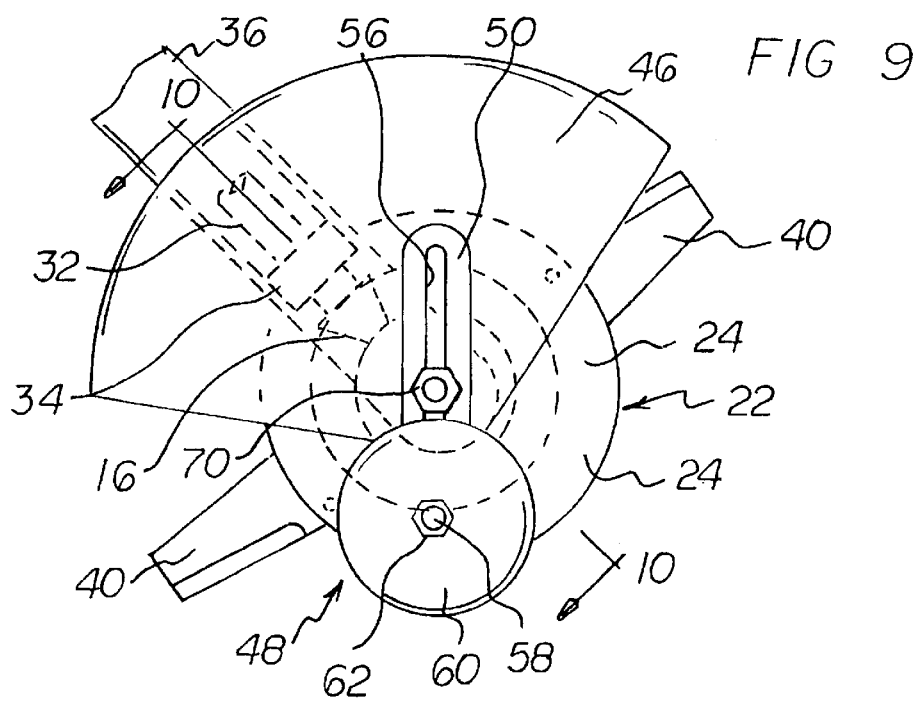
FIG. 9 is a side view of a second embodiment of the edger attachment apparatus of the invention, wherein the second embodiment has a height adjustment feature.
Figure 10:
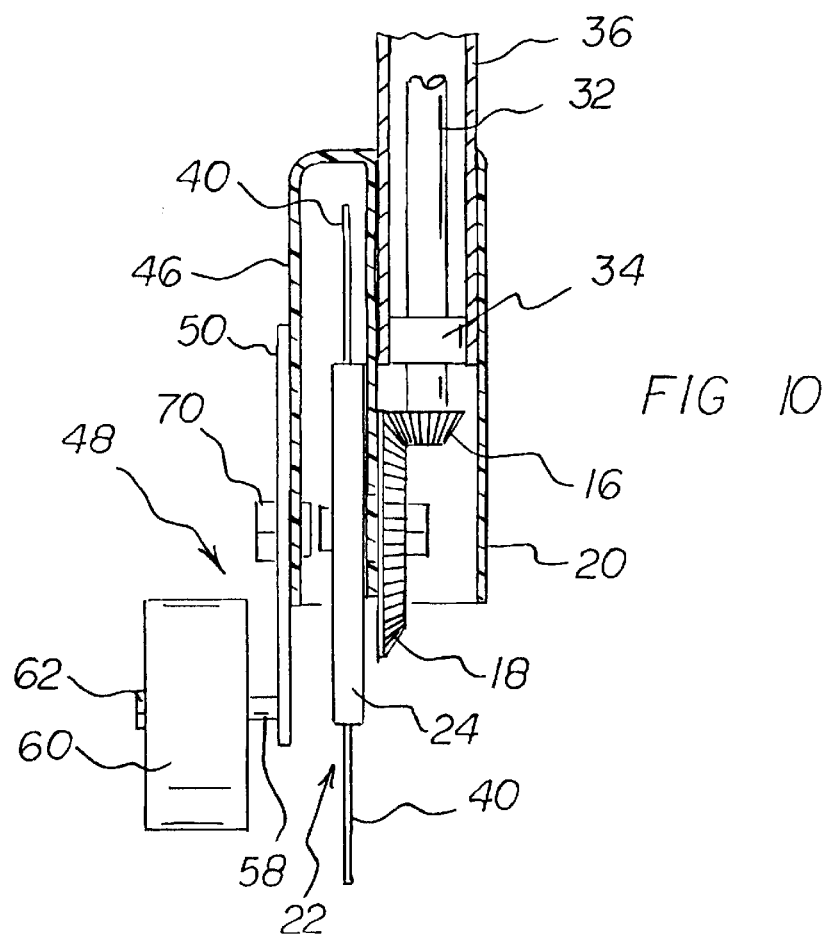
FIG. 10 is a cross-sectional view of the embodiment of the invention shown in FIG. 9 taken along line 10—10 thereof.
Figure 13:
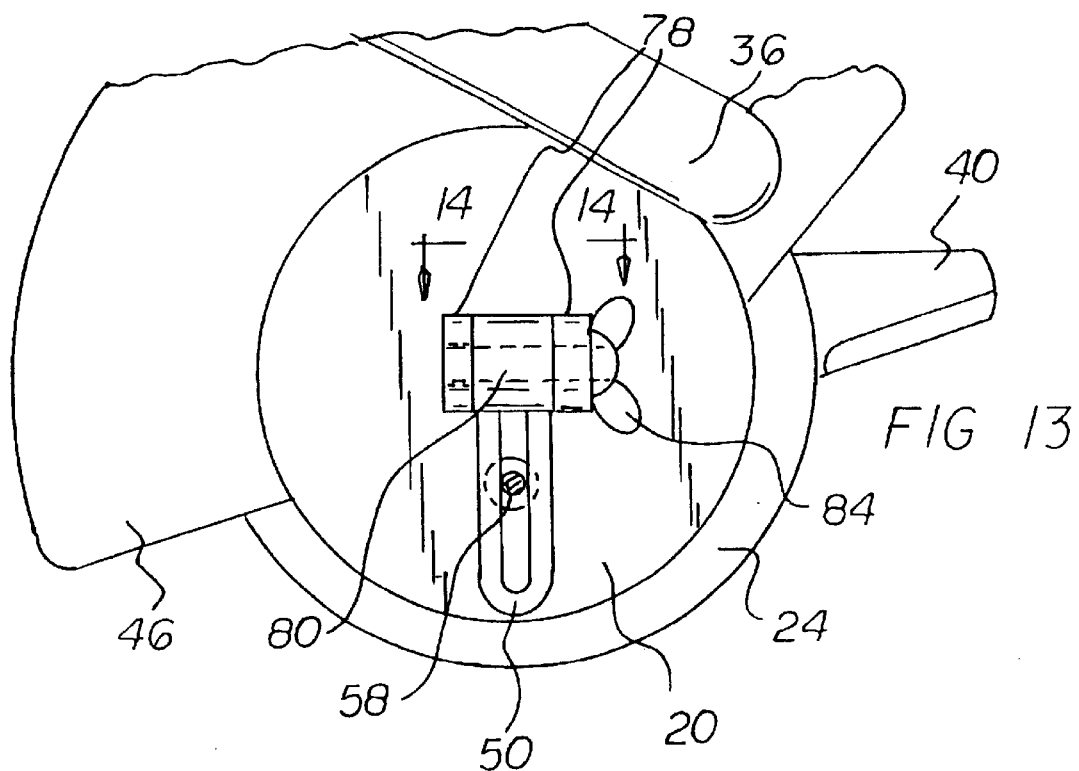
FIG. 13 is a partial cross-sectional view of the embodiment of the invention shown in FIG. 12 taken along line 13—13 thereof.
Figure 14:
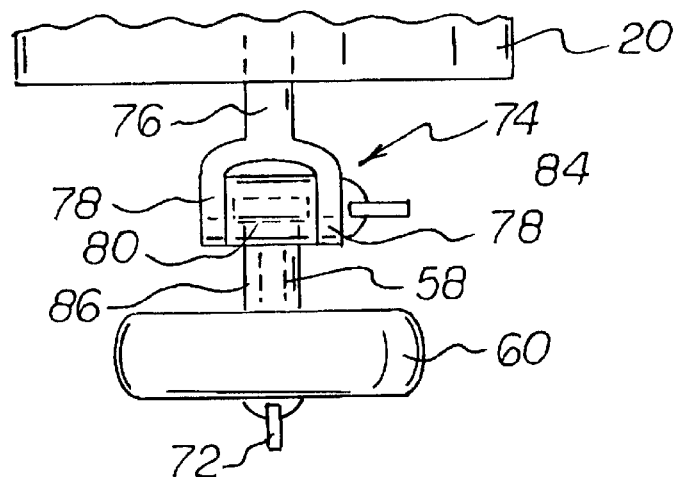
FIG. 14 is a partial top view of the embodiment of the invention shown in FIG. 13 taken along line 14—14 thereof.

Turning to FIGS. 9–10, a second embodiment of the invention is shown. Reference numerals are shown that correspond to like reference numerals that designate like elements shown in the other figures. In addition, the second embodiment has a height adjustment assembly. A blade assembly shroud 46 is attached to the gear housing 20, and the wheel assembly support includes a wheel assembly attachment plate 50 which is attached to the blade assembly shroud 46.

The height adjustment assembly includes a wheel assembly attachment plate 50 which includes a height adjustment slot 56 and a height adjustment lock bolt 70 received in the height adjustment slot 56. The wheel assembly 48 includes a wheel axle 58 attached to the wheel assembly attachment plate 50. A wheel 60 is received on the wheel axle 58, and a wheel axle nut 62 is provided for retaining the wheel 60 on the wheel axle 58.

To adjust the height of the portions of the apparatus to the right of the wheel assembly attachment plate 50, for controlling the depth of penetration of the blades 40 as they cut, the height adjustment lock bolt 70 is loosened, and the wheel assembly attachment plate 50 is moved upward or downward so that the wheel 60 is raised or lowered. Then, when the desired height adjustment has been made, the height adjustment lock bolt 70 is tightened again.

It is noted that when the wheel 60 is raised to a higher position, the blades 40 are relatively lower with respect to the bottom of the wheel 60 and can penetrate deeper into the material which is cut. Alternatively, when the wheel 60 is lowered to a lower position, the blades 40 are relatively higher with respect to the bottom of the wheel 60, and the penetration of the blades 40 into the material which is cut is reduced.

Also, the relatively small diameter, power transmission driving gear and the relatively large diameter, power receiver gear are different in the embodiment of the invention shown in FIGS. 9 and 10. That is, the relatively small diameter, power transmission driving gear is a first bevel gear 16, and the relatively large diameter, power receiver gear is a second bevel gear 18.

Turning to FIGS. 11–14, a third embodiment of the invention is shown. Reference numerals are shown that correspond to like reference numerals that designate like elements shown in the other figures. In addition, the third embodiment of the invention has both a height adjustment assembly and a tilt adjustment assembly.

The height adjustment assembly includes a wheel assembly attachment plate 50 which includes a height adjustment slot. A wheel axle 58 extends through the height adjustment slot in the wheel assembly attachment plate 50. A wheel axle housing 86 jackets a portion of the wheel axle 58 between a wheel 60 and the wheel assembly attachment plate 50. A wheel axle nut is in a form of a wing nut 72 for tightening the wheel axle housing 86 against the wheel assembly attachment plate 50, such that the wheel axle 58 and the wheel 60 are locked in a selected position in the height adjustment slot 56.

As described hereinabove with respect to the second embodiment of the invention, when the wheel axle 58 is lowered in the height adjustment slot, the blades 40 of the edger blade assembly 22 are relatively higher. Alternatively, when the wheel axle 58 is raised in the height adjustment slot 56, the blades 40 of the edger blade assembly 22 are relatively lower.

The tilt adjustment assembly includes a tilt angle lock assembly 74. The tilt angle lock assembly 74 includes a first tilt angle lock member 76 connected to the gear housing 20. The first tilt angle lock member 76 includes a pair of separated fork portions 78. A wheel-assembly-attachment-plate support member 80 is received between the separated fork portions 78. The wheel-assembly-attachment-plate support member 80 is connected to the wheel assembly attachment plate 50. A tilt angle, wing-headed, locking bolt 84 is threaded through the fork portions 78 and the wheel-assembly-attachment-plate support member 80.

When the tilt angle, wing-headed, locking bolt 84 is loosened, compression of the wheel-assembly-attachment-plate support member 80 between the fork portions 78 is relaxed, and the wheel assembly can be rotated around the tilt angle, wing-headed, locking bolt 84. That is, since the wheel 60 is on the wheel axle 58, and since the wheel axle 58 is connected to the wheel assembly attachment plate 50, and since the wheel assembly attachment plate 50 is connected to the wheel-assembly-attachment-plate support member 80, when the wheel 60 is lifted upward, the entire wheel assembly rotates around the tilt angle, wing-headed, locking bolt 84, as shown by tilt rotation arrow 68.

More specifically, as the wheel assembly is rotated around the tilt angle, wing-headed, locking bolt 84, in effect, the edger blade assembly 22 is tilted with respect to the wheel 60. When a desired tilt angle is obtained between the edger blade assembly 22 and the wheel 60, the tilt angle, wing-headed, locking bolt 84 is tightened, and the desired tilt angle is locked in position.

To change the tilt angle, the tilt angle, wing-headed, locking bolt 84 is loosened, the wheel 60 is rotated around the tilt angle, wing-headed, locking bolt 84 to a new desired tilt angle. Then, the tilt angle, wing-headed, locking bolt 84 is retightened.

The components of the edger attachment apparatus for a string trimmer device of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved edger attachment apparatus for a string trimmer device that is low in cost, relatively simple in design and operation, and which may advantageously be used to carry out both a horizontal cutting function, when the string trimmer head is employed, and a vertical cutting function, when the edger attachment apparatus is employed. With the invention, an edger attachment apparatus for a string trimmer device is provided which does not use two motors, two handles, two drive shaft housings, and two drive shafts. With the invention, an edger attachment apparatus for a string trimmer device is provided which permits removal of a string trimmer head from the drive-shaft-to-attachment coupling of a string trimmer device and replacement thereof with an edger attachment apparatus. With the invention, an edger attachment apparatus for a string trimmer device provides an edger attachment apparatus which has a height adjustment feature. With the invention, an edger attachment apparatus for a string trimmer device provides an edger attachment apparatus which has a tilt adjustment feature. With the invention, an edger attachment apparatus for a string trimmer device provides an edger attachment apparatus which has a tilt adjustment feature which can be locked into a desired tilt adjustment angle.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. An edger attachment apparatus for attaching to a drive-shaft-to-attachment coupling of a string trimmer device after the string trimmer head has been detached from the drive-shaft-to-attachment coupling, comprising:
   an edger driven-shaft housing attachable to the drive-shaft-to-attachment coupling,
   an edger driven shaft housed in said edger driven-shaft housing,
   a relatively small diameter, power transmission driving gear driven by said edger driven shaft,
   a relatively large diameter, power receiver gear driven by said relatively small diameter, power transmission driving gear,
   a blade assembly drive shaft connected to said relatively large diameter, power receiver gear,
   a gear housing for housing said relatively large diameter, power receiver gear, wherein said gear housing is connected to said edger driven-shaft housing,
   an edger blade assembly driven by said blade assembly drive shaft,
   a wheel assembly support attached to said gear housing, and
   a wheel assembly connected to said wheel assembly support,
   wherein said edger blade assembly includes:
      a blade support supported by said blade assembly drive shaft, and
      blades attached to said blade support, and
      wherein said blade support includes blade reception slots, and said blades are connected to said blade support with blade pivots.

2. The apparatus of claim 1, further including:
   an edger driven shaft top bearing and an edger driven shaft bottom bearing located between said relatively small diameter, power transmission driving gear and said edger driven-shaft housing.

3. The apparatus of claim 1, further including:
   a coupling end reception sleeve connected to an end of said edger driven shaft, wherein said coupling end reception sleeve includes a coupling end reception well.

4. The apparatus of claim 1 wherein said relatively small diameter, power transmission driving gear is housed in said edger driven-shaft housing.

5. The apparatus of claim 1, further including:
   a blade assembly shroud attached to said gear housing for covering said edger blade assembly.

6. The apparatus of claim 1 wherein:
   said relatively small diameter, power transmission driving gear is a worm gear, and
   said relatively large diameter, power receiver gear is a worm-driven gear.

7. The apparatus of claim 1 wherein said wheel assembly support includes a wheel assembly attachment plate attached to said gear housing.

8. The apparatus of claim 1, further including:
   a blade assembly shroud attached to said gear housing, and
   wherein said wheel assembly support includes a wheel assembly attachment plate which is attached to said blade assembly shroud.

9. The apparatus of claim 1, further including a height adjustment assembly.

10. The apparatus of claim 9 wherein said height adjustment assembly includes a wheel assembly attachment plate which includes a height adjustment slot and a height adjustment lock bolt received in said height adjustment slot.

11. The apparatus of claim 10 wherein said wheel assembly includes:
   a wheel axle attached to said wheel assembly attachment plate,
   a wheel received on said wheel axle, and
   a wheel axle nut for retaining said wheel on said wheel axle.

12. The apparatus of claim 1 wherein:
   said relatively small diameter, power transmission driving gear is a first bevel gear, said relatively large diameter, power receiver gear is a second bevel gear.

13. The apparatus of claim 1, further including:
a height adjustment assembly.

14. The apparatus of claim 13 wherein said height adjustment assembly includes:
a wheel assembly attachment plate which includes a height adjustment slot,
a wheel axle which extends through said height adjustment slot in said wheel assembly attachment plate,
a wheel axle housing which jackets a portion of said wheel axle between a wheel and said wheel assembly attachment plate, and
a wheel axle nut which is in a form of a wing nut for tightening said wheel axle housing against said wheel assembly attachment plate, such that said wheel axle and said wheel are locked in a selected position in said height adjustment slot.

15. An edger attachment apparatus for attaching to a drive-shaft-to-attachment coupling of a string trimmer device after the string trimmer head has been detached from the drive-shaft-to-attachment coupling, comprising:
an edger driven-shaft housing attachable to the drive-shaft-to-attachment coupling,
an edger driven shaft housed in said edger driven-shaft housing,
a relatively small diameter, power transmission driving gear driven by said edger driven shaft,
a relatively large diameter, power receiver gear driven by said relatively small diameter, power transmission driving gear,
a blade assembly drive shaft connected to said relatively large diameter, power receiver gear,
a gear housing for housing said relatively large diameter, power receiver gear, wherein said gear housing is connected to said edger driven-shaft housing,
an edger blade assembly driven by said blade assembly drive shaft,
a wheel assembly support attached to said gear housing, and
a wheel assembly connected to said wheel assembly support,
further including a tilt adjustment assembly,
wherein said tilt adjustment assembly is embodied in said wheel assembly, and
wherein said wheel assembly includes:
a wheel tilt plate,
a wheel assembly hinge connected between said wheel tilt plate and said wheel assembly attachment plate,
a wheel axle connected to said wheel tilt plate,
a wheel supported by said wheel axle, and
a wheel axle nut for securing said wheel to said wheel axle.

16. The apparatus of claim 15 wherein said tilt adjustment assembly includes a tilt angle lock assembly.

17. The apparatus of claim 16 wherein said tilt angle lock assembly includes:
a first tilt angle lock member connected to said gear housing, wherein said first tilt angle lock member includes a pair of separated fork portions,
a wheel-assembly-attachment-plate support member received between said separated fork portions, wherein said wheel-assembly-attachment-plate support member is connected to said wheel assembly attachment plate,
a tilt angle, wing-headed, locking bolt threaded through said fork portions and said wheel-assembly-attachment-plate support member.

18. A lawn edger attachment apparatus for removable attachment to a conventional lawn trimmer device having a motive power means, a drive shaft, and a removable lawn trimmer head, comprising:
an edger housing removably coupleable to said lawn trimmer device drive shaft in place of said lawn trimmer head,
said edger housing having an edger blade mounted therein for rotation about a predetermined axis extending at an angle to the axis defined by said lawn trimmer drive shaft, and
power transmission means combined with said edger housing for transmitting the output of said lawn trimmer drive shaft to said edger blade to cause said edger blade assembly to rotate about said predetermined axis, and
wherein said edger housing further includes edger housing adjustment means for adjusting the relative angle between the lawn trimmer drive shaft axis and said predetermined axis edger blade rotation axis.

19. The apparatus of claim 18 wherein said edger housing further includes a ground support member for enabling said edger housing to be supported on the ground during rotation of said edger blade.

20. The apparatus of claim 19 wherein said ground support member further includes height adjust means for adjusting the height said edger housing is supported above the ground.

21. A lawn string trimmer apparatus comprising in combination:
a lawn string trimmer having a drive motor, a drive shaft, and a coupling at the distal end of said drive shaft,
a first attachment comprising a string trimmer assembly,
a second attachment comprising an edger blade assembly,
said first and second attachments being interchangeably attachable to said drive shaft via said coupling,
and wherein said edger blade assembly has means for driving an edger blade about an axis extending at an angle to the rotation axis of said string trimmer assembly, and wherein said edger blade assembly further includes a tilt adjustment assembly for adjusting the angle between said edger blade drive axis and said string trimmer rotation axis.

* * * * *